Oct. 30, 1962 C. Z. MONROE ETAL 3,060,443
ROTARY STAPLER AND SEALER MECHANISM FOR CARTON MACHINE
Filed June 10, 1960 8 Sheets-Sheet 1

INVENTORS
CHARLES Z. MONROE
HARRY B. EGLESTON by: Wolfe, Hubbard, Voit & Osann
ATTYS.

INVENTORS
CHARLES Z. MONROE
HARRY B. EGLESTON by: Wolf, Hubbard, Voit & Osann
ATTYS.

Oct. 30, 1962 C. Z. MONROE ETAL 3,060,443
ROTARY STAPLER AND SEALER MECHANISM FOR CARTON MACHINE
Filed June 10, 1960 8 Sheets-Sheet 6

INVENTORS
CHARLES Z. MONROE
HARRY B. EGLESTON
by: Wolfe, Hubbard, Voit & Osann
ATTYS.

3,060,443
Patented Oct. 30, 1962

3,060,443
ROTARY STAPLER AND SEALER MECHANISM FOR CARTON MACHINE
Charles Z. Monroe, Detroit, and Harry B. Egleston, Livonia, Mich., assignors to The Ex-Cell-O Corporation, Detroit, Mich., a corporation of Michigan
Filed June 10, 1960, Ser. No. 35,361
13 Claims. (Cl. 1—105)

The present invention relates generally to carton fabricating machinery and, more specifically, to a rotary stapler and sealer mechanism for use in such machinery. It finds particular, but not exclusive, utility when embodied in machines for forming, coating, filling, closing and sealing gable top cartons of the type disclosed in United States Patent No. 2,750,095, issued June 12, 1956, on the application of Carroll R. Alden.

One object of the invention is to provide a carton stapler and sealer mechanism particularly well adapted for high-speed foolproof operation in a high production carton fabricating machine of the character just set forth.

Another object of the invention is to provide a stapler and sealer mechanism for use on spaced cartons conveyed in a continuous procession at a relatively high uniform velocity, and wherein the elements of the mechanism operating directly on the cartons during stapling and sealing are adapted to move at the same velocity as the cartons.

A further object is to provide a carton stapler and sealer mechanism of the foregoing type in which the staple driving means, the clinching means, and the carton, move in such precisely maintained synchronism that instant driving and clinching of the staple is accomplished without interruption of the continuous motion of any of these members.

Still another object of the invention is to provide a carton stapler and sealer mechanism of the character set forth wherein the plies of the carton to be stapled are securely held together to prevent misalignment and insure tight closure during the stapling and sealing operation.

A further object is to provide a carton stapler and sealer mechanism of the above character and wherein the parts which operate directly on the carton are isolated from the other working parts of the mechanism to facilitate day to day cleaning and maintenance of the mechanism.

Other objects and advantages will becomes apparent as the following description proceeds, taken together with the accompanying drawings, wherein.

While the invention is susceptible of various modifications and alternative constructions, a certain illustrative embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

Figures 1, 2:
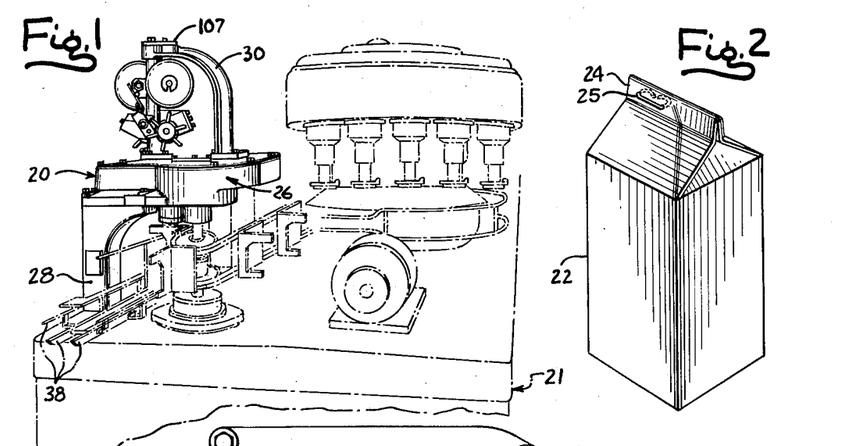
FIGURE 1 is a fragmentary perspective view of a carton fabricating machine having adjacent its output end a stapler and sealer mechanism embodying the present invention.
FIG. 2 is an enlarged perspective view of a gable top carton of the type produced by the machine and mechanism shown in FIG. 1.

Referring more specifically to FIGURE 1, the invention is there exemplified in a sealer and stapler mechanism 20 which is incorporated in a machine 21 for fabricating gable top cartons. The machine 21 is adapted to receive a supply of flat tubular blanks which are appropriately cut and scored, and to operate on them in such a manner that a procession of filled and sealed cartons is discharged therefrom. In the course of such operation, each flat tubular blank is withdrawn from a stack or magazine by means of a feeding mechanism, is erected into a tubular form and passed through a bottom forming mechanism, a moistureproof coating mechanism, and a cooling mechanism, the container then being filled, closed, sealed and discharged from the machine.

The machine 21 is adapted to produce paper cartons such as the gable top milk carton disclosed in Alden U.S. Patent No. 2,750,095, supra, and illustrated in FIG. 2 hereof. The carton 22 comprises a single sheet of paper or paperboard cut and scored so as to be divided into a plurality of panels and areas which are utilized for the walls and closure parts when the carton is erected. The blank, as presented to the machine, is folded upon itself and has its side seam already glued, thus defining a collapsed, open-ended tube. When erected and subsequently processed in the machine, the carton emerges with its familiar gable top shape. This includes a pair of opposed sloping panels surmounted by a central top rib 24. One-half of the top rib 24 includes a collapsible pouring spout which may be subsequently opened out by the user. The remaining half of the top rib is fixed and includes a mechanical fastener in the form of a staple 25 driven transversely through its plies.

General Arrangement

Figure 3:
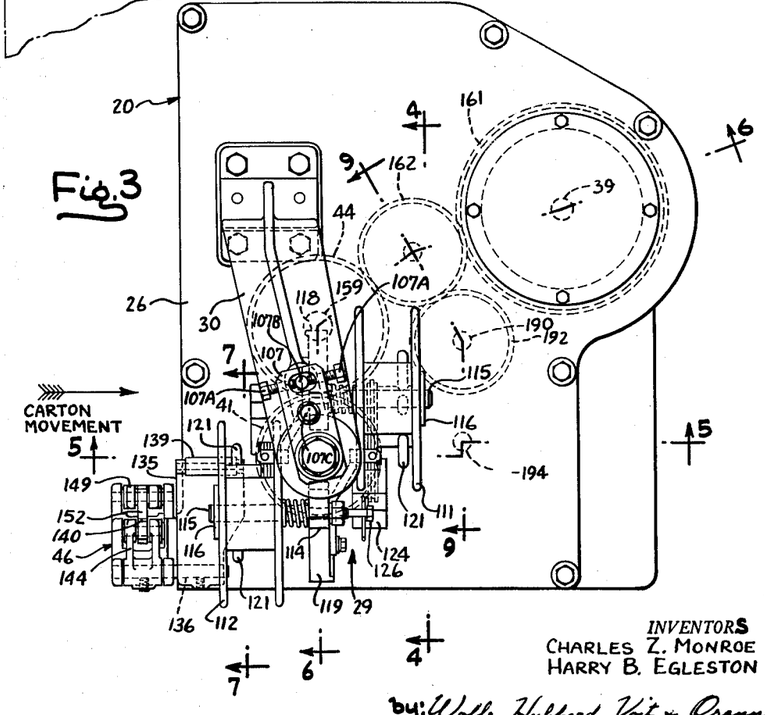
FIG. 3 is an enlarged plan view of the illustrative stapler and sealer mechanism shown in FIG. 1.

The stapler and sealer mechanism 20 is designed as a largely self-contained unit and is mounted on the console of the machine 21 adjacent its output end. The mechanism 20 comprises a flat, boxlike housing 26 (FIGS. 1, 3 and 4) mounted in overlying relation with the filled carton conveyor and supported on one of the conveyor drive housings and on an outboard column 28.

Figure 10:
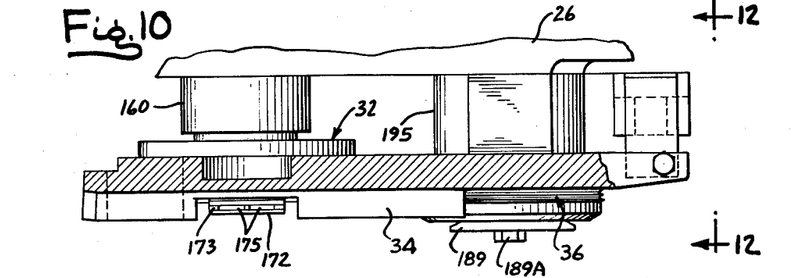
FIGS. 10, 11, and 12 are, respectively, side, plan, and vertical sectional views through the guide tunnel of the stapler and sealer mechanism.
Figure 11:
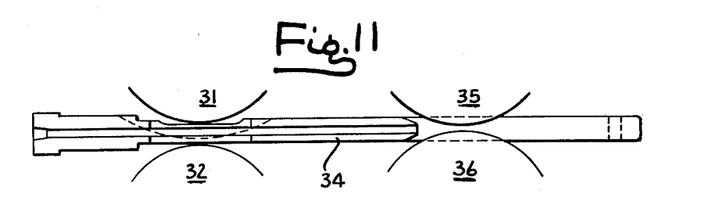
Figure 12:
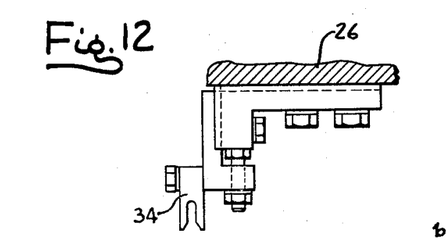

The housing 26 has a stapler turret assembly 29 (FIGS. 3 and 4) journaled thereon for rotation about an upright axis. The turret assembly extends downwardly from a curved support bracket 30, through the housing 26, and terminates in a stapler head 31 adapted to form and drive a staple through the top rib 24 of each carton passing through the mechanism 20. The housing 26 also has journaled therein a clincher roll 32 (FIGS. 4 and 13) which cooperates with the stapler head 31, such parts depending from the housing and straddling a guide tunnel 34 (FIGS. 10, 11 and 12). The latter slidably engages the top rib 24 of each successive carton on its way through the mechanishm. A pair of sealer rolls 35, 36 (FIGS. 5, 9 and 11) is journaled in said housing and situated in depending relation therefrom at the discharge end of the guide tunnel 34. The rolls 35, 36 are adapted to bear against the opposed faces of the successive carton top ribs as they emerge from the guide tunnel after stapling.

The cartons are moved through the stapler and sealer mechanism 20 and onto the discharge guide rails 38 by the filled carton conveyor of the machine. This conveyor also drives the mechanism 20 through shaft 39 (FIGS. 3 and 6) which extends upwardly into the housing.

Stapler Turret Assembly

The stapler turret assembly 29 comprises the stapler head 31, which rotates beneath the housing 26, and a wire feed device 40, which rotates above the housing. In the present instance, the assembly 29 includes a drive sleeve 41 interposed between the stapler head 31 and the wire feed device 40. The drive sleeve 41 is formed with gear teeth on its outer periphery meshing with, and receiving power from, an intermediate drive gear 42 fixed to clincher roll drive gear 44.

For the purpose of actuating the turret assembly 29 in timed relation to its rotation, the assembly 29 is provided with a pivot shaft 45. The latter extends axially of the turret assembly and is adjustably fixed at its upper end to the projecting end of support bracket 30. The stationary pivot shaft 45 may also have longitudinal passages extending through most of its length and which serve as convenient routes for the lines which convey lubricant to the inside parts of the turret assembly.

The operation of the turret assembly 29 is also controlled in part by a wire feed throwout linkage 46 situated on the exterior of the housing 26 at the input end of the mechanism 20. The linkage 46 is adapted to govern the feeding of successive increments of wire to be formed and driven into a carton top rib by the stapler head 31.

Stapler Head

The stapler head 31 (FIGS. 4, 13A, 14 and 15), is nested compactly against the underside of the housing 26, depending therefrom into proximity with the carton rib guide tunnel 34. In cooperation with the clincher roll 32, which also depends from the underside of the housing and into proximity with the opposite side of the tunnel 34, the stapler head 31 is adapted to form, drive, and clinch a staple in the top rib of each carton passing through the mechanism 20. In the present instance, the head 31 is constructed and arranged to perform such operations twice in each revolution of the turret assembly 29.

Figures 4, 4A, 5:
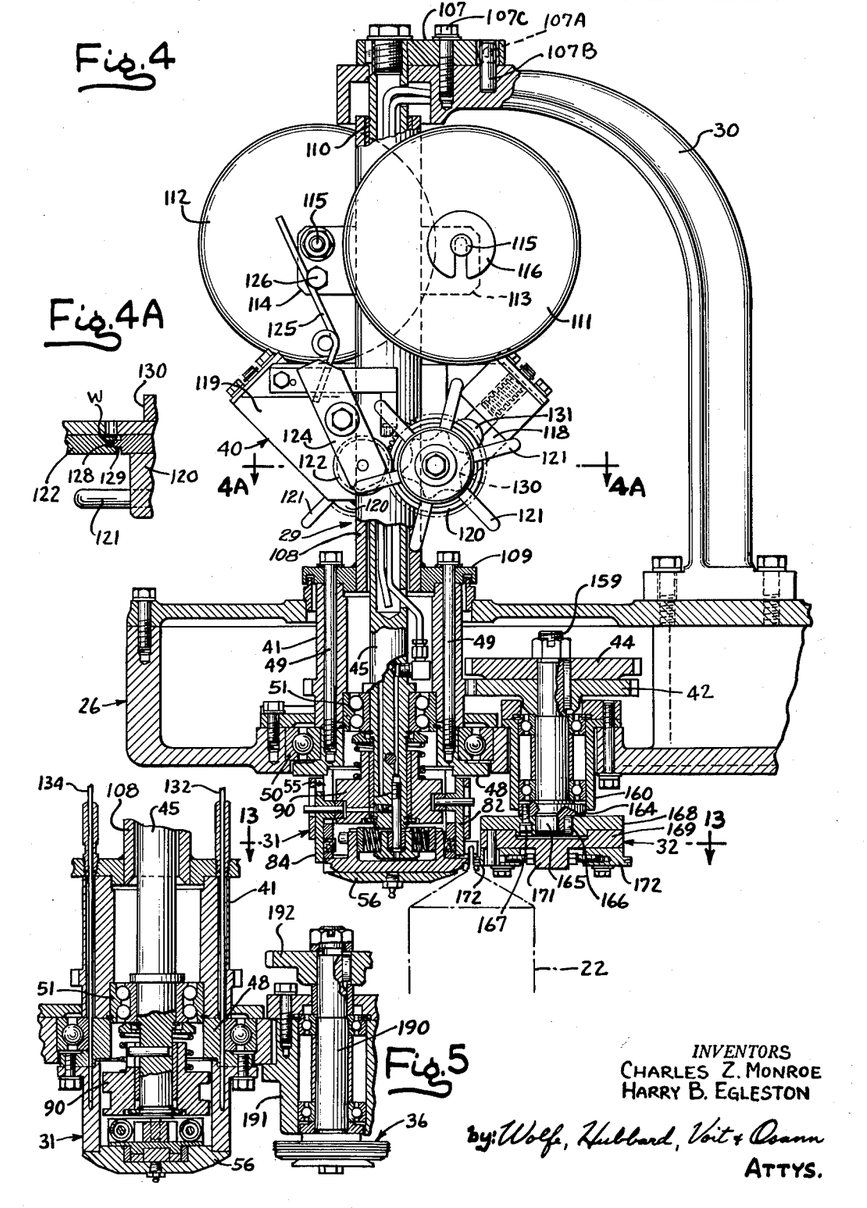
FIG. 4 is an enlarged vertical sectional view through the stapler and sealer mechanism taken in the plane of the line 4—4 in FIG. 3.
FIG. 4A is an enlarged, fragmentary, horizontal sectional view through the wire feed rolls, taken in the plane of the line 4A—4A in FIG. 4.
FIG. 5 is an enlarged fragmentary vertical sectional view through the mechanism, taken in the plane of the line 5—5 in FIG. 3.
Figure 14:
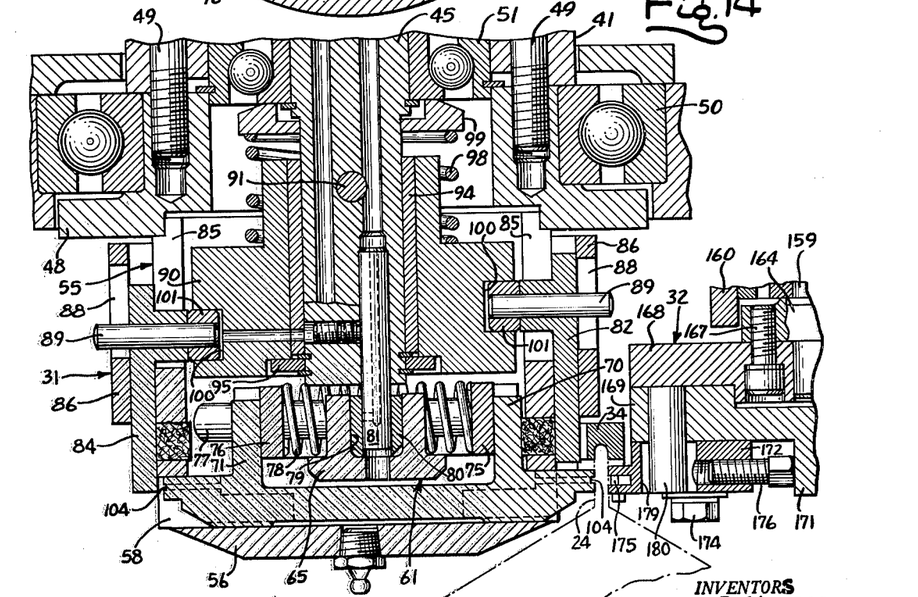
FIGS. 14 and 15 are enlarged fragmentary views, partly in elevation and partly in vertical section, of the lower portion of the stapler head and corresponding generally to the sectional views of FIGS. 4 and 5, respectively.

The stapler head 31, as an integral portion of the turret assembly, rotates bodily therewith. The head 31 includes a flanged bearing collar 48 which in this case is rigidly fixed to the turret drive sleeve 41 by means of throughbolts 49 (FIGS. 4 and 14). The collar 48 is journaled in main support bearing 50 surrounding its outer periphery and which happens to be of the antifriction type. The collar 48 and drive sleeve 41 are also journaled on the stationary pivot shaft 45 of the turret assembly by means of an antifriction bearing 51. The latter in the present instance happens to be a double row thrust bearing and is seated between fixed abutments on the pivot shaft 45 and on the interior wall of the drive sleeve and collar 41, 48.

Rigidly fixed to the collar 48, as by means of flanges 52 and cap screws 54, is a head casing 55 (FIGS. 4, 13A, 14 and 15). The head casing 55 terminates at its lower end in a generally circular and, in this instance, externally beveled, support plate 56. These members cooperate with, and protectively enclose, the working parts of the stapler head.

As indicated in FIGS. 13, 13A, 14 and 15, the support plate 56 is formed with a relatively wide groove or channel 58 extending diametrically across its inner face. Fixed against each side wall of the channel and running the full length thereof are a pair of hardened gibs 59, 60. A bifurcated cut off and former 61 comprising a pair of laterally spaced bars 62, 64, connected by a central bridge 65 is reciprocably mounted on the floor of the channel and slidably guided therealong by the gibs. In this instance, the bridge 65 interfits with a complemental recess 63 in the upper face of each of the bars 62, 64, defining a detachable but positive connection permitting the bridge and bars to move in unison along the channel 58.

Figure 13:
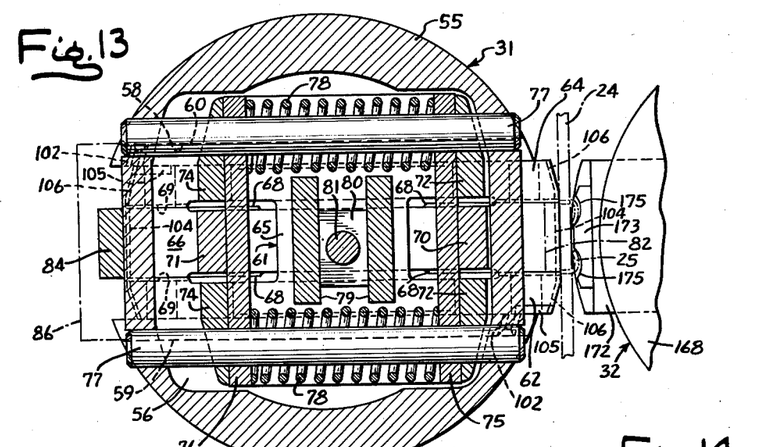
FIG. 13 is an enlarged horizontal view, partly in section and partly in plan, taken through the lower portion of the stapler head in the plane of the line 13—13 in FIG. 4.
Figures 13A, 14A:
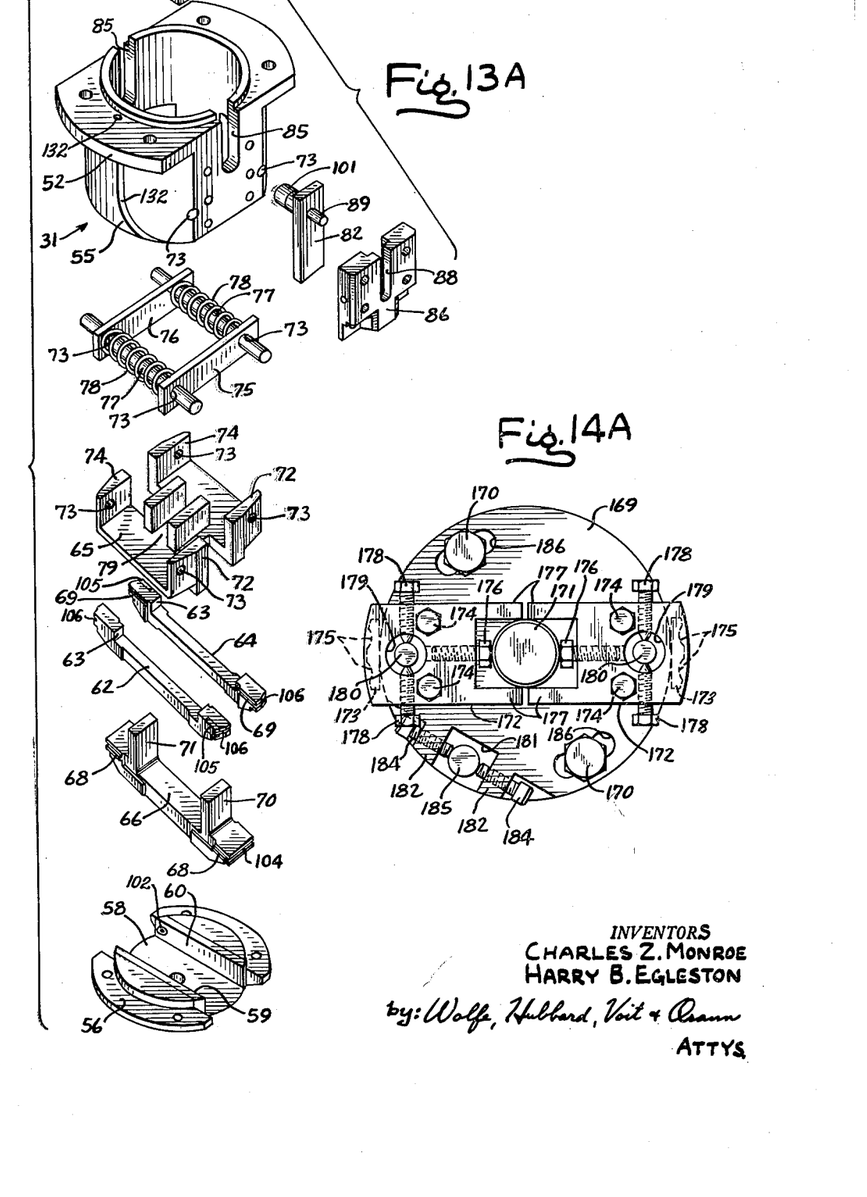
FIG. 13A is an exploded perspective view of the stapler head showing details of its principal internal parts.
FIG. 14A is a bottom plan view of the clincher roll assembly as illustrated in FIG. 4.

A driver 66 is centrally located in the channel 58 and disposed for sliding movement relative to the bars of the cut off and former 61 and to the channel 58. The driver 66 may be guided in such movement by the abutting faces of lateral enlargements adjacent its end portion and adjacent the end portions of the bars 62, 64 of the cut off and former 61. Relative sliding movement between these parts in a direction other than along the channel 58 is precluded by means of longitudinal tongues 68 projecting outwardly from the laterally enlarged portions of the driver and which slidably engage corresponding grooves 69 in the adjacent faces of the laterally enlarged portions of the bars 62, 64 (FIGS. 13, 13A).

Provision is made for yieldably holding the cut off and former 61 and the driver 66, in substantial lateral alignment with each other in the channel 58 to facilitate their proper movement in the operation of the stapler head. This is accomplished by providing a pair of upstanding abutments 70, 71 adjacent either end of the driver but spaced inwardly somewhat from its outward extremities. By the same token, corresponding pairs of aligning abutments 72, 74, are provided on the bridge 65 of the cut off and former member 61 and are spaced adjacent to but inwardly from the ends of the bars 62, 64. Interposed between the aligned pairs of upstanding abutments is a loading spring assembly which in this instance comprises a pair of spaced apart, substantially parallel yokes 75, 76 extending transversely of the driver and the cut off and former. The yokes 75, 76 have interposed therebetween a pair of relatively heavy compression springs 78 each centered upon a guide pin 77 mounted in alined holes 73 in the casing 55, abutments 72, 74, and in the yokes 75, 76.

For the purpose of imparting relative sliding movement between the driver 66, the cut off and former 61, and the channel 58 of the support plate, the bridge 65 of the cut off and former 61 is formed with a transverse guideway 79 adapted to receive a sliding bearing block 80. The bearing block 80 is pivotally mounted at its center on a fixed pin 81 secured to the lower end of the turret pivot shaft 45 and disposed eccentrically with respect to the rotational axis of the stapler head and support plate. Thus, as the latter rotate, the eccentrically located pivot point of the bearing block 80 remains fixed with respect to the rotational axis of the stapler head. This imparts sliding movement to the cut off and former 61 relative to the channel 58 of the support plate. When the driver 66 is blocked, such action also results in relative sliding movement between the cut off and former 61 and the driver 66.

Mounted in diametrically opposed relation on the outside of hollow casing 55 of the stapler head, and disposed for axial movement therealong, are a pair of anvils 82, 84. The anvils are each adapted to move in timed relation to the driver 66 and to the cut off and former 61 and to the support plate 56 during the operating cycle (FIGS. 13, 13A, 14 and 15). Each of the anvils 82, 84 is adapted to ride vertically along a corresponding flat face on the stapler head casing 55, being formed with an integral hub which rides in a guide slot 85 in the head casing. Each anvil is also held in place by one of a pair of retainer plates 86 overlying its outer face and fixed to the head casing. The plates also overlie the holes 73 in the casing 55 and thus serve as retainers for the spring centering pins 77.

Each retainer plate 86 is provided with a guide slot 88 which receives a radially projecting pin 89 fixed to the anvil and extending through its guide hub. The anvil is mounted for sliding movement axially of the head casing 55 between a raised position where its lower end is completely clear of the driver 66, and a lowered position, where its lower end portion is projected squarely across the end of the driver and in position to arrest the same.

For actuating the anvils 82, 84 in timed relation with the rotational movement of the stapler head and with the relative sliding movement of the driver 66, the cut off and former 61, and the support plate channel 58, the stapler head includes a fixed cam 90. The latter is attached to the lower depending end of the turret pivot shaft 45 and is constrained against rotation as by means of a pin 91 which projects radially from the shaft 45 to engage a longitudinal slot 92 in the cam body. A bushing 94, which may be of sintered metallic material, may be interposed between the inner bore of the cam 90 and the pivot shaft 45. The cam and bushing are seated in place on the pivot shaft by means of a cam seat 95 fixed to the shaft as by means of snap rings 96. An overload protection spring 98, bearing at its upper end against a thrust collar 99 carried by the support shaft, bears at its lower end against the main shoulder of the cam and yieldably holds the latter in position on the seat 95. The cam 90 has a cam track 100 in its outer periphery and which guides a pair of follower rollers 101, each mounted on a respective one of the anvils 82, 84.

Figure 16:
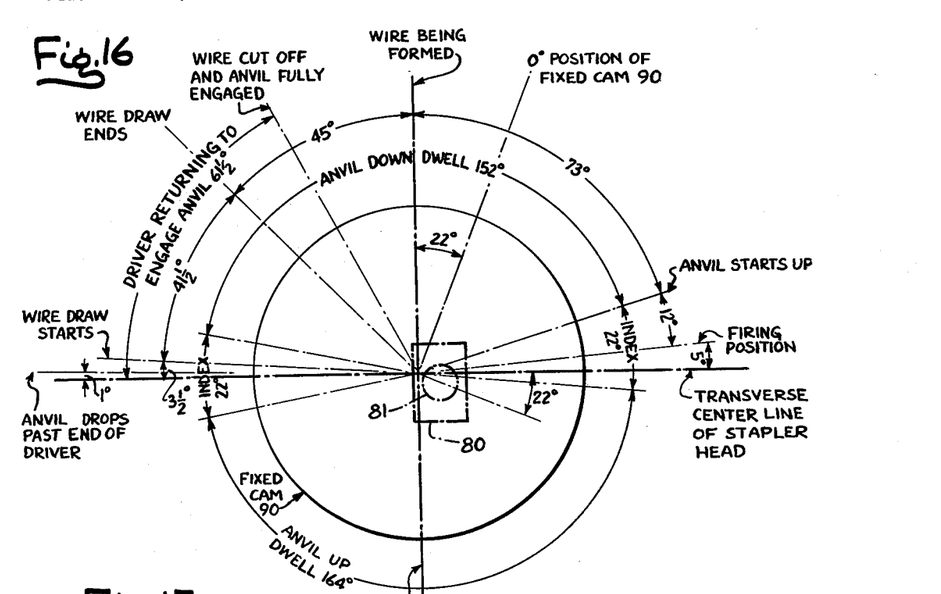
FIG. 16 is a diagrammatic view illustrating the timing of the components of the stapler head.

As indicated earlier herein, the stapler head is adapted to drive two staples per revolution. Its operation will be more easily followed by considering the events occurring in one-half revolution just after the driving of one staple and leading up to the driving of the next one. For purposes of analysis, reference may be made to the timing diagram of FIG. 16 in conjunction with the sequential views of FIGS. 17 to 20, inclusive.

Figures 17, 18, 19, 20:
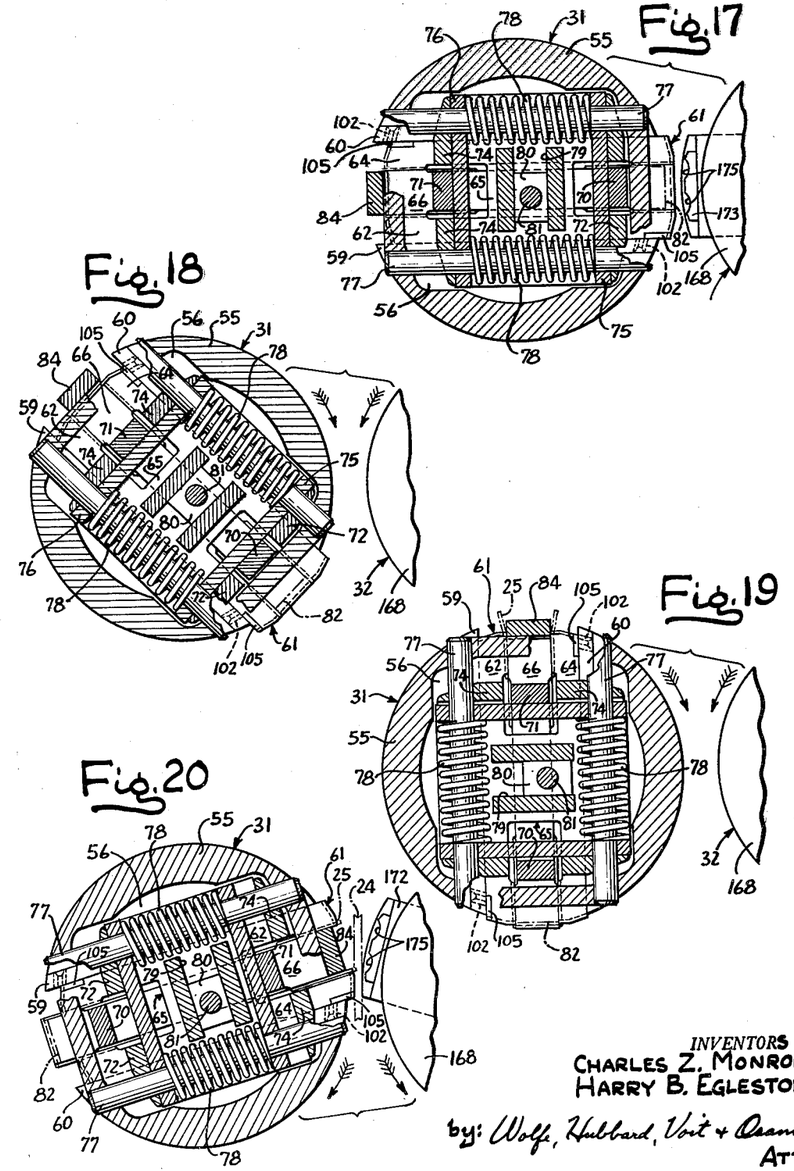
FIGS. 17 to 20, inclusive, are views through the stapler head similar to FIG. 13, but to a somewhat smaller scale, and showing sequentially the relative positions of the parts at various points in the operating cycle.

Starting out with the stapler head 31 in the condition of FIG. 17, it will be noted that a staple has just been driven and the stapling head is aligned on its transverse center line which lies approximately in a horizontal plane. Considering the parts at the left-hand end of the figure, it will be noted that the anvil 84 has begun to descend but its lower end has not quite reached the plane of the top of the driver 66. After approximately one degree of rotation of the stapler head in a clockwise direction, the lower end of the anvil 84 drops past the plane of the top of the driver and continues to move downwardly. After about 3½ degrees of clockwise rotation, the wire feed begins to pull an increment of wire downwardly and to feed it into a hardened annular die 102 in the gib 60. After another 41½ degrees of angular movement, or in other words, a total of 45 degrees of clockwise rotation of the stapler head, the anvil 84 has moved downwardly to its lower position. At this point, the wire feed has fed a full increment of wire for the next staple and disposed it across the left-hand end of the cut off and former 61 and the driver 66. The left-hand end of the driver 66 has also been brought into firm abutment with the anvil 84, locking the increment of wire in place therebetween and holding it in a wire groove 104 running across the end of the driver. Under these conditions, the stapler head is in the position indicated in FIG. 18.

Further clockwise rotation of the stapler head results in continued sliding movement of the cut off and former 61 toward the left. As an incident to such action, a hardened insert 105 of carbide or the like integral with the bar 64 cooperates with the wire die 102 and shears off a wire increment of proper size for the formation of a staple. The end face of the driver 66 also becomes firmly engaged against the anvil and is held there by the pressure of the springs 78 and yokes 75, 76. Such continued sliding movement of the cut off and former effects engagement between the wire increment and grooves 106 running across the ends of the bars 62, 64, progressively bending the wire around the lateral edges of the anvil to bring it gradually into the U-shape required for driving as a staple. At this point, the stapler head 31 has rotated clockwise 90 degrees to a position of alignment with its longitudinal center line, as illustrated in FIG. 19.

As the clockwise movement of the stapler head continues, the cut off and former 61 continues to move outwardly in the same direction along the support plate while the anvil 84 precludes such motion by the driver, and the staple is completed and ready for driving. As the parts approach the position indicated in FIG. 20, the anvil 84, under the action of the fixed cam 90, undergoes an upward movement and commences to pull out of engagement with the spring-loaded end of the driver 66. At this point, the top rib 24 of a carton 22 has approached tangentially and the clincher roll 32 has brought a clincher block into position for backing up the driver.

With another 12 degrees of clockwise rotation of the stapler head beyond the position of FIG. 20, the anvil 84 pulls out of engagement with the end of the driver 66 and the latter, under the released compression of the loading springs 78, now drives, shifting radially outward and driving the staple through the carton top rib 24. As soon as the staple ends pass through the top rib 24, they are caught by the block of the clincher roll assembly and bent reversely against the surface of the top rib. The staple is guided during the instant of driving by reason of the longitudinal grooves 69 adjacent the end of the cut off and former, the latter having been rolled against the top rib at the instant of driving.

*Stapler Head Timing Adjustment*

For the purpose of maintaining the stapler head 31 in precise synchronism and registration with the clincher roll assembly 32 and the conveyor so that each successive staple will be properly driven and clinched, the timing of the stapler head may be selectively adjusted. By reason of such adjustment, the staple driving point may be selectively and precisely varied through an arc of about 6° or, in other words, plus or minus 3° from the theoretical driving position illustrated in FIG. 16. The overriding consideration in making the adjustment is to select the driving position which produces the best staple in the carton top rib 24.

Figure 15:
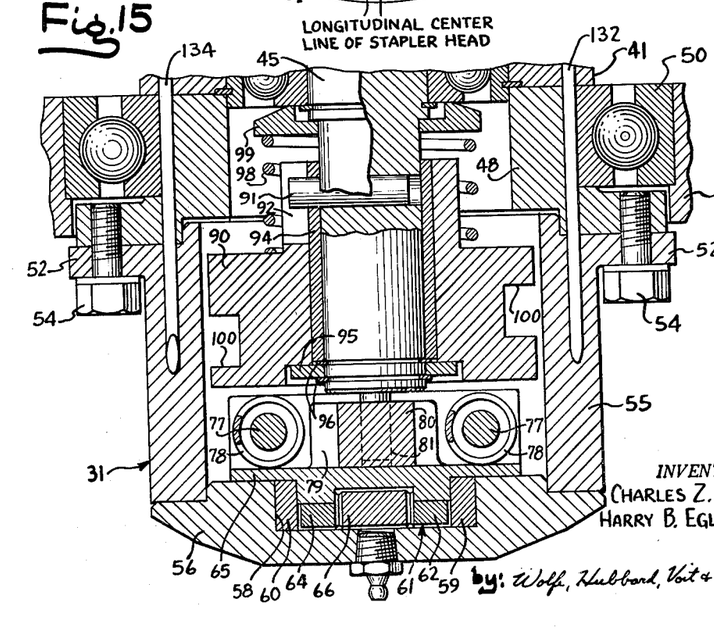

In the present instance, the timing adjustment of the stapler head 31 is effected by changing the angular position of the cam 90 and the stationary pivot shaft 45 on which it is mounted. As indicated earlier herein, the cam 90 can move axially of the shaft 45 in the event of an overload but is precluded from rotating on the shaft 45 by reason of the pin and slot connection 91, 92 (FIGS. 14 and 15). Accordingly, upon more specific reference to FIGS. 3 and 4, it will be noted that an adjusting arm 107 is situated at the top of the bracket 30 and keyed or otherwise rigidly fixed to the pivot shaft 45. The arm 107 carries a pair of opposed set screws 107A mounted transversely thereof and which bear against an upstanding pin 107B secured in the upper portion of the bracket 30. Angular adjusting movement of the arm 107, shaft 45 and cam 90 under the action of the set screws 107A, and within the limits previously described, is permitted by an oblong clearance aperture in the arm 107 surrounding the pin 107B. Operatively associated with the arm 107 is a clamp screw 107C which engages a tapped hole in the upper portion of the bracket 30. An appropriate recess in the arm 107 surrounding the clamp screw 107C permits angular adjustment of the arm upon loosening of the clamp screw. The latter is, of course, tightened securely after an adjustment has been made.

Wire Feed Device

Turning once more to FIG. 4, and as indicated earlier herein, it will be noted that the wire feed device 40 is situated in that portion of the turret assembly above the housing 26. It is supported on a hollow shaft 108 fixed to the drive sleeve 41 by means of a mounting flange 109 and the throughbolts 49. The upper end of the wire feed support shaft 108 is journaled on the pivot shaft 45 as by means of a sleeve bearing 110. The shaft carries adjacent its upper end a pair of wire supply spools 111, 112 each journaled on one of a pair of diametrically opposed radial lugs 113, 114. The spools may be pivoted on pins 115 projecting outwardly and oppositely from these lugs and retained in place by means of slotted retainer collars 116. Below the spools 111, 112, and pivotally attached to a pair of diametrically opposed flanges 118, 119, on the wire feed support shaft 108 are two sets of intermittently actuated wire feed rolls, one set for each supply spool.

Each set of wire feed rolls comprises a roll 120 with a plurality of radial actuating arms 121, and a somewhat smaller roll 122 journaled on a spring-loaded follower arm 124. The arm 124 is centrally pivoted to one of the flanges 118, 119 on the support shaft 108 and is biased by means of a relatively heavy wire spring 125 bearing against a stop bolt 126 on one of the spool lugs. To insure proper feeding of the wire, the rolls 120, 122 are geared together and one is formed with a wire receiving groove while the other has an interfitting flange. In the present instance, as shown in FIG. 4A, the roll 122 has a groove 128 for receiving the wire W, and the roll 120 has a peripheral flange 129 which interfits with the groove and bears against the wire..

In order to regulate precisely the length of the increments of wire fed to the stapler head 31, the feed rolls 120, 122 are accurately indexed. This is accomplished in the present case by the use of an indexing cam 130 integrally fixed to the larger roll 120 and which is engaged by the follower roller of a spring-loaded detent 131 mounted on an adjacent one of the support flanges 118, 119. The wire is supplied to the stapler head from each set of feed rolls via a corresponding one of a pair of diametrically opposed feed tubes 132, 134 running axially through the central portion of the turret. As shown in FIGS. 4, 5 and 15, each of these feed tubes leads into a slot in the wall of the stapler head casing 55 and then makes a 90° bend in trailing relation to the motion of the stapler head, each ending at corresponding one of the gib cut off dies 102 on the support plate.

Provision is made for intermittently actuating the wire feed device 40 in timed relation to the rotational movement of the stapler head, and for doing so in a foolproof manner such that the presence of a carton to be stapled is a necessary prerequisite to actuation of the wire feed device. This is accomplished in the present instance by the use of the wire feed throwout linkage 46, mentioned earlier herein.

Referring more specifically to FIGS. 3, 7, 8 and 8A, it will be noted that the wire feed throwout linkage 46 comprises a rocker arm 135 fixed to a rock shaft 136 which is journaled upon a horizontal axis in bearings carried by an upstanding bracket 138 fixed to the housing 26 at the input end thereof. At its free end, the rocker arm has journaled thereon a tripping roller 139 which is adapted to be brought periodically into engagement with successive ones of the radial actuating arms 121 of the wire feed rolls 122.

The rocker arm 135 is adapted to be moved into and out of operating position with respect to the wire feed roll 122 by the use of a toggle linkage comprising, in this case, a pair of toggle links 140 and 141 pivoted to each other by means of pin 142 and disposed generally vertically. The upper toggle link 140 is pivotally connected to a crank arm 144, as by means of pin 145, the crank arm 144 being rigidly fixed to the rock shaft 136. The lower toggle link 141 is pivotally connected at its lower end by pin 146 to a pair of horizontally extending lugs 148 on the bracket 138.

The toggle linkage is actuated through a generally vertically disposed lever arm 149 pivotally secured as by pin 150 to a pair of lugs 151 at the lower end of the bracket 138. At its upper end, the lever arm 149 is pivotally connected to lower toggle link 141 by means of a relatively short connecting link 152 and pins 154, 155. At its lower end, the lever 149 is provided with a sensing cam 156 adapted to contact successive ones of the filled cartons in the conveyor as they reach the vicinity of the stapler and sealer mechanism. The lever is spring-biased toward the carton conveyor as by means of an adjustable loading spring 158.

Figures 6, 7, 8, 8A:
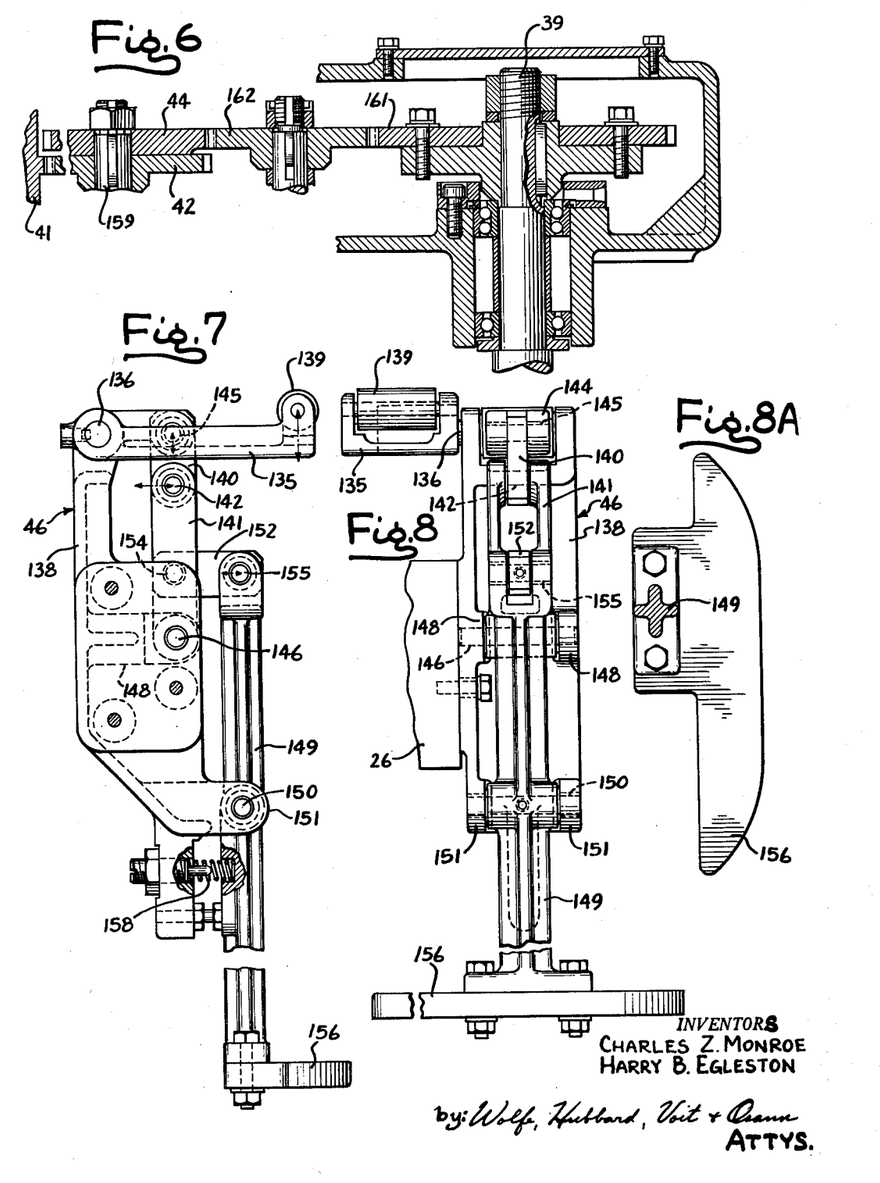
FIG. 6 is an enlarged fragmentary vertical sectional view through the main drive shaft and main drive gear of the mechanism, taken in the plane of the line 6—6 in FIG. 3.
FIGS. 7 and 8 are enlarged side and end elevation views, respectively, illustrating the wire draw throwout linkage.
FIG. 8A is a plan view of the sensing cam illustrated in FIGS. 7 and 8 as a part of the wire draw throwout linkage.

The action of this arrangement is such that, when a carton is present in the conveyor receptacle entering the mechanism 20, the carton wall contacts the sensing cam 156 and shifts the lever 149 clockwise (as viewed in FIG. 7). This straightens the toggle links 140 and 141, raising the bell crank 144 and causing the rock shaft 136 and rocker arm 135 to rotate through a small angle in a counterclockwise direction (as viewed in FIG. 7), bringing the tripping roller 139 into the path of the radial actuating arms 121 of the wire feed rolls. The action is such that the toggle links 140, 141 are moved through dead center and held in a slightly locked position so that any tendency of the rocker arm 135 to be shifted downwardly as the roller 139 is engaged by the actuating arm 121 is avoided.

On the other hand, in the event that no carton is present in the entering conveyor receptacle, and assuming that a carton was present in the preceding conveyor receptacle, the sensing cam 156 and lever 149 are permitted to rock counterclockwise (as viewed in FIG. 7) under the action of biasing spring 158. This causes the two toggle links 140, 141 to scissor toward one another, rocking the bell crank 144, rock shaft 136 and rocker arm 135 clockwise and pulling the follower roller 139 out of the path of the actuating arms 121 of the wire feed rolls.

Clincher Roll Assembly

The clincher roll assembly 32 (FIGS. 4, 13, 14 and 14A) is situated adjacent the stapler head 31 and journaled for rotation about an upright axis parallel to that of the stapler head. As indicated earlier herein, it is driven in timed cooperative relation with the latter and periodically abuts against the face of the carton top rib 24 opposite the one engaged by the driver 66 and the cut off and former 61.

The clincher roll assembly comprises a vertically disposed shaft 159 journaled in a pair of vertically spaced bearings within an enclosed bearing cartridge 160. At its upper end, the clincher roll shaft 159 has fixed thereon clincher roll drive gear 44 which is disposed in meshing engagement with an idler gear 162, the latter being driven by main drive gear 161 fixed to the conveyor shaft 39. Also fixed to the clincher roll shaft 159 below the gear 44 is an intermediate drive gear 42 which is disposed in meshing engagement with drive sleeve 41 of the stapler turret assembly and serves to drive the latter (FIGS. 4 and 6).

At its lower end, the clincher roll shaft 159 is formed with a circular mounting pad 164, which projects slightly below the bearing cartridge, and terminates in a central hub 165 below the pad. Rigidly fixed to the pad and hub as by means of key 166 and cap screw 167 is a mounting flange 168 which, in turn, carries a clincher jaw holder 169. The latter is in this instance fixed to the mounting flange as by cap screws 170 and has a depending hub 171 at its center. A pair of clincher jaws 172 is mounted in diametrically opposed relation on the clincher jaw holder 169 and secured in place by cap screws 174 which engage tapped holes in the holder. Each of the jaws 172 has a radially extending segmental portion with a hardened block or insert 173 integrally fixed thereto. The insert 173 has a pair of laterally spaced clinching recesses 175 extending along the convex peripheral surface of the segmental portion of the jaw.

For the purpose of effecting precise radial adjustment of the clincher jaws 172 relative to the holder 169, each of the latter is provided with a radial adjusting screw 176. Each adjusting screw 176 is adapted to engage a tapped hole running radially of its corresponding clincher jaw and to bear against the depending hub 171 of the clincher jaw holder 169.

In order to facilitate accurate circumferential or angular adjustment of each clincher jaw 172 relative to the holder 169, the inner end of each jaw is provided with a pair of laterally spaced arms 177 adapted to bear against the hub 171 of the clincher jaw holder. Angular adjusting movement of each jaw is accomplished by the use of a pair of opposed adjusting screws 178 mounted in tapped holes extending inwardly from its lateral edges and terminating in a central aperture 179 in the jaw. The aperture has a fixed stud 180 extending axially from the clincher jaw holder 169 and the ends of the set screws 178 are adapted to bear against such stud. Movement of the jaws during adjustment, and subsequent clamping of the latter relative to the holder, is permitted by the cap screws 174 and their clearance holes in the jaws.

For the purpose of effecting circumferential adjustment of both clincher jaws 172 in unison, the clincher jaw holder 169 is formed with a peripheral notch 181 flanked by a pair of lugs 182, all spaced angularly from the diameter on which the clincher jaws are located. As indicated in FIG. 14A, each of the lugs 182 has a tapped hole which receives one of a pair of opposed adjusting screws 184. The adjusting screws are adapted to bear against a downwardly projecting stud 185 fixed to the mounting flange 168 to position the holder 169 and jaws 172 circumferentially relative to the mounting flange 168. To facilitate such adjustment, the openings in the holder 169 for the cap screws 170 are formed as arcuate slots 186.

*Sealer Rolls*

Referring next to FIGS. 5, 9, 10, and 11, it will be noted upon more specific reference that the sealer rolls 35, 36 are situated adjacent the end of the guide tunnel 34 of the carton top rib 24 and in position to exert a pinch or squeeze longitudinally of the rib as the latter emerges from the guide tunnel following the stapling operation. The rolls 35, 36 are preferably knurled on those surfaces that contact the top rib and they serve to force the tacky moisture-proof coated plies of the rib together with sufficient pressure to block off any incipient leakage channels around the arms of the staple or elsewhere in the top rib. In addition to the sealing action, one of the rolls, for example the roll 36, may be equipped with one or more stamping dies 187 to date stamp each carton top rib with the day of the week or some other dating indicia. The dies 187 are mounted in a quickly detachable dater ring 188 secured in place by means of a clamp 189 and cap screw 189A, the latter engaging a tapped hole in the center of sealer roll shaft 190.

The sealer roll 36 is carried at the lower end of the sealer roll shaft 190 which is journaled on vertically spaced bearings within a bearing cartridge 191. The shaft 190 has keyed or drivingly secured thereto at its upper end a drive gear 192 which meshes with, and receives power from, the idler gear 162 driven by main drive gear 161. The other sealer roll 35 is fixed to the lower end of a vertical shaft 194 journaled in vertically spaced bearings housed within a bearing cartridge 195. In this instance, the sealer roll 35 and its shaft 194 are not power driven but simply turn as a carton top rib 24 passes between the rolls 35, 36. However, if desired, the roll 35 may readily be power driven by mounting on the upper end of its shaft 194 a gear of appropriate size to mesh with the sealer roll drive gear 192.

Figure 9:
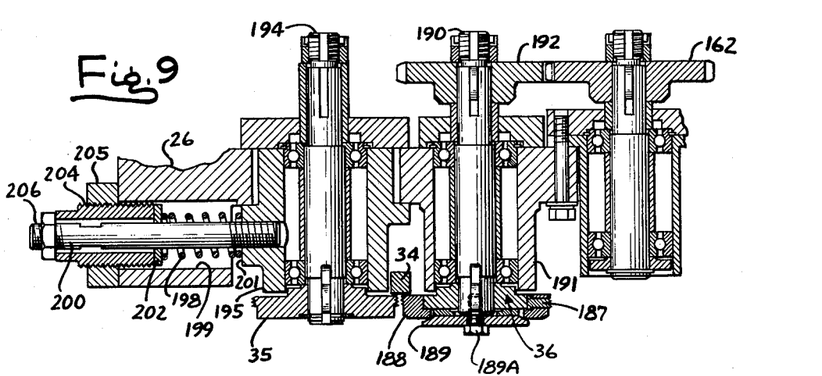
FIG. 9 is an enlarged fragmentary vertical sectional view through the sealer members of the mechanism, taken in the plane of the line 9—9 in FIG. 3.

For the purpose of enabling the sealer rolls 35, 36 to exert proper compression for sealing the carton top rib 24, provision is made for yieldably pressing one of the sealer rolls toward the other (FIG. 9). In the present instance, the sealer roll 35, together with its support shaft 194 and bearing cartridge 195 are mounted for limited lateral movement with regard to the roll 36 and yieldably urged toward the same. This is accomplished by the use of adjustable loading spring 198 situated within a bore 199 in the housing 26 and disposed in surrounding relation with a radially projecting stud 200 fixed to the bearing cartridge 195. The spring 198 is adapted to bear at one end against an annular shoulder 201 on the bearing cartridge, and at its other end against a thrust washer 202 positioned by means of an externally threaded adjusting sleeve 204 and locknut 205, the sleeve and locknut being adapted to regulate the pressure of the spring 198. The extreme biased position of the sealer roll 35 relative to the sealer roll 36 may be precisely adjusted by means of nut 205 which engages threads 206 on the outer end of the stud 200.

*Résumé of Operation*

While the operation of the mechanism 20 is probably clear from the foregoing to those skilled in the art, a brief comprehensive summary might be helpful at this point.

The machine 21 is adapted to take flat collapsed tubular blanks, and to erect, coat, cool, fill and close them in rapid succession. The filled and closed cartons are moved in a continuous procession into the stapler and sealer mechanism 20 by the filled carton conveyor which, after stapling and sealing, discharges the cartons along the conveyor guide rails 38 at the output end of the machine.

As a carton 22 arrives at the mechanism 20 for processing by the latter, the side wall of the carton engages the sensing cam 156 (FIGS. 3, 7, 8 and 8A), pushing the same outwardly. This actuates the toggle members of the wire feed throwout linkage 46, raising the rocker arm 135 and bringing the tripping roller 139 into the path of an actuating arm 121 of a wire feed roll. Rotation of the turret assembly 29 in timed relation with the movement of the machine conveyor and the carton causes the wire roll actuating arm 121 to be tripped by the roller 139 and this results in feeding an increment of wire to the stapler head 31 which rotates in unison with the wire feed device 40 of the turret assembly.

At this point, the fixed cam 90 in the stapler head has caused the anvil 84 to descend into the path of the driver 66, gripping the increment of wire therebetween and holding it in wire groove 104 (FIGS. 13, 17, 18, 19 and 20). Continued rotation of the stapler head also causes the cut off and former 61 to slide in an outward direction toward the anvil 84, shearing off the wire increment between the wire die 102 and the hardened insert 105 and causing the end portion of the wire increment to wrap around the lateral edges of the anvil 84. Further rotation of the stapler head 31, with the spring-loaded driver 66 arrested by the anvil 84, results in the completion of the formation of the staple and brings it into position for driving. At that point, the top rib 24 of the carton to be stapled has entered the tunnel 34 and the clincher roll assembly 32 has rotated a clincher jaw 172 into position on the far side of the rib 24 to clinch the ends of the staple. The stapler head drives the staple 25 at the instant that the fixed cam 90 lifts the anvil 84 out of engagement with the end face of the driver 66, the latter immediately springing toward the carton rib and driving the legs of the staple through it and the clincher jaw serving to bend them reversely toward the rib.

The stapled carton is then moved by the conveyor into engagement with the sealer rolls 35, 36 (FIGS. 3, 9, 10 and 11) which move in timed relation with the conveyor, the stapler head 31 and the clincher roll assembly 32. The sealer rolls 35, 36 exert a longitudinal squeeze along the top rib 24 and thus block off any incipient leakage passages around the staple or elsewhere in the top rib. As an incident to such action, one of the sealer rolls may also impress an appropriate dating symbol on the top rib. Upon emerging from the sealer rolls, the carton is discharged tangentially from the conveyor and onto guide rails 38 at the output end of the machine.

We claim as our invention:

1. A rotary stapler mechanism for high-speed carton making machines and comprising, in combination, a rotatable turret assembly including a stapler head and a wire feed, a clincher roll assembly adapted for rotation in timed relation to said turret assembly, means for actuating said stapler head to drive staples in timed relation with rotation of said clincher roll assembly, and means responsive to the entry of a carton between said stapler head and said clincher roll assembly for controlling said wire feed.

2. A rotary stapler mechanism for a high-speed carton machine and comprising, in combination, a housing adapted for mounting on the machine, a stapler head journaled on said housing, a wire feed device also journaled on said housing and bodily rotatable with said stapler head, said wire feed device being adapted to feed predetermined increments of wire to said stapler head, and means on said housing for tripping said wire feed device periodically in response to the presence of a carton to effect feeding of an increment of wire to said stapler head.

3. A rotary stapler mechanism for high-speed carton machines and comprising, in combination, a housing adapted for mounting on the machine, a stapler head journaled on said housing, a wire feed device also journaled on said housing and bodily rotatable with said stapler head, said wire feed device being adapted to feed predetermined increments of wire to said stapler head, means on said housing for tripping said wire feed device periodically to effect feeding of an increment of wire to said stapler head, and means on said housing for precluding tripping of said wire feed device in the absence of a carton for processing by said stapler head.

4. A rotary stapler mechanism for a high-speed carton machine and comprising, in combination, a housing adapted for mounting on the machine, a stapler head journaled on said housing, a wire feed support also journaled on said housing and bodily rotatable with said stapler head, means on said support for holding a supply of wire, a pair of coacting wire feed rolls on said support, one of said rolls having tripping arms thereon, and a rocker arm pivotally mounted on said housing for tripping an arm of said one wire feed roll periodically to effect feeding of an increment of wire to said stapler head.

5. A rotary stapler mechanism for a high-speed carton machine having a discharge conveyor and comprising, in combination, a housing adapted for mounting on the machine, a stapler head journaled on said housing, a wire feed support also journaled on said housing and bodily rotatable with said stapler head, means on said support for holding a supply of wire, a pair of coacting wire feed rolls on said support, one of said rolls having tripping arms thereon, a rocker arm pivotally mounted on said housing for tripping an arm of said one wire feed roll periodically to effect feeding of an increment of wire to said stapler head, a carton sensing cam, lever means adapted for urging said carton sensing cam into the path of cartons on the conveyor, and means including a mechanical linkage interposed between said sensing cam and said rocker arm for shifting the same out of tripping position in the absence of a carton on the conveyor.

6. In a rotary stapler mechanism for a carton fabricating machine, a rotary stapler head comprising, in combination, a driver, a bifurcated cut-off and former disposed in straddling relation with said driver and slidable longitudinally thereof, means for resiliently maintaining said driver and said cut-off and former in lateral alignment, an anvil disposed for movement substantially normal to said driver and into and out of the path thereof, means for positively moving said driver and said cut-off and former out of lateral alignment to form a staple and to cock said driver against the action of said resilient means, means for positively shifting said anvil into engagement with the end of said driver when in cocked position, and means for positively shifting said anvil out of engagement with said driver to drive the staple in timed relation to the rotation of said head.

7. In a rotary stapler mechanism for a carton fabricating machine, a rotary stapler head comprising, in combination, a head casing, a support plate fixed to said head casing and having a channel in the inner face thereof, a driver mounted for sliding movement longitudinally of said channel, a pair of cut-off and former bars disposed in straddling relation with said driver and slidable longitudinally with respect thereto along said channel, a bridge spanning said driver and positively connected to said cut-off and former bars for sliding movement in unison with said bars, means for resiliently maintaining said driver and said cut-off and former bars in lateral alignment, an anvil disposed for movement substantially normal to said driver and into and out of the path thereof, means connected with said bridge for positively moving said driver and said cut-off and former bars out of lateral alignment to form a staple and to cock said driver against the action of said resilient means, means for positively shifting said anvil into engagement with the end of said driver when in cocked position, and means for positively shifting said anvil out of engagement with said driver to drive the staple in timed relation to the rotation of said head.

8. In a rotary stapler mechanism for a carton fabricating machine, the combination comprising a wire feed, a rotatable stapler head casing, a support plate on said head casing, a driver mounted on said support plate, a bifurcated cut-off and former disposed in straddling relation with said driver and slidable longitudinally thereof on said support plate, means for resiliently maintaining said driver and said cut-off and former in lateral alignment, an anvil mounted on said head casing and disposed for movement substantially normal to said driver and into and out of the path thereof, means including an eccentric for positively moving said driver and said cut-off and former out of lateral alignment to form a staple and to cock said driver against the action of said resilient means, means including a fixed cam for positively shifting said anvil into engagement with said driver when in cocked position and for positively shifting said anvil out of engagement with said driver to drive the staple in timed relation to the rotation of said head, and means connecting said eccentric to said fixed cam.

9. In a rotary stapler mechanism having a rotatable stapler head, a clincher roll assembly comprising, in combination, a clincher roll shaft, a mounting flange fixed to said shaft, a clincher jaw holder fixed to said mounting flange, means for circumferentially adjusting said clincher jaw holder relative to said mounting flange, a clincher jaw fixed to said mounting flange, and means for adjusting said clincher jaw radially and circumferentially relative to said mounting flange.

10. In a rotary stapler mechanism, having a rotatable stapler head, a clincher roll assembly driven in timed relation with said head and comprising, in combination, a clincher roll shaft, a mounting flange fixed to said shaft, a clincher jaw holder having a peripheral adjustment relative to said mounting flange, an axially projecting hub on said clincher jaw holder, a pair of diametrically opposed axially projecting studs fixed to said holder on opposite sides of said hub, a pair of clincher jaws adjustably fixed to said holder, each said jaw having an aperture therein and adapted to fit over a respective one of said studs, and a plurality of set screws engaging tapped holes in each said jaw and adapted to bear against said studs and said hub.

11. In a rotary stapler mechanism having a rotatable stapler head, a clincher roll assembly driven in timed relation with said head and comprising, in combination, a clincher roll shaft, a mounting flange fixed to said shaft, a clincher jaw holder having a peripheral adjustment relative to said mounting flange, an axially projecting hub on said clincher jaw holder, a pair of diametrically opposed axially projecting studs fixed to said holder on opposite sides of said hub, a pair of clincher jaws adjustably fixed to said holder, each said jaw having a pair of laterally spaced arms at its inner end adapted to bear against said axially projecting hub, each said jaw also having an aperture therein and adapted to fit over a respective one of said studs, and a plurality of set screws engaging tapped holes in each said jaw and adapted to bear against said studs and said hub to effect precise positioning of said jaw.

12. A rotary stapler mechanism for a high-speed carton fabricating machine and comprising, in combination, a housing adapted for mounting on said machine, a turret assembly journaled on said housing and including a stapler head and a wire feed both bodily rotatable therewith, a support bracket on said housing pivotally connected to said turret assembly, a pivot shaft fixed within said turret assembly, means interposed between said pivot shaft and said stapler head for actuating the latter to drive staples in timed relation to the rotation of said head, a clincher roll assembly driven in timed relation to said head, said assembly being adapted to back up said stapler head and clinch the legs of the staples driven by said head, and an angular adjustment means interposed between said pivot shaft and said support bracket for controlling the timing of said stapler head.

13. A rotary stapler mechanism for a carton fabricating machine and comprising, in combination, a housing adapted for mounting on said machine, a turret assembly journaled on said housing and including a stapler head and a wire feed both bodily rotatable therewith, a support bracket on said housing pivotally connected to said turret assembly, a stationary pivot shaft mounted within said turret assembly, means interposed between said pivot shaft and said stapler head for actuating the latter to drive staples in timed relation to the rotation of said head, a clincher roll assembly driven in timed relation to said head, said assembly being adapted to back up said stapler head and clinch the legs of the staples driven by said head, an arm fixed to said pivot shaft for angular movement therewith, and means interposed between said arm and said support bracket for effecting angular positioning of said pivot shaft and thereby controlling the timing of said stapler head.

References Cited in the file of this patent

UNITED STATES PATENTS

| | | |
|---|---|---|
| 1,664,434 | Sheldon | Apr. 3, 1928 |
| 1,796,143 | Davidson | Mar. 10, 1931 |
| 2,521,935 | Monroe | Sept. 12, 1950 |
| 2,957,289 | Monroe | Oct. 25, 1960 |